June 24, 1958  W. O. STEPHENSON  2,840,759
AUTOMOBILE DOME LIGHT CIRCUIT
Filed Nov. 19, 1956
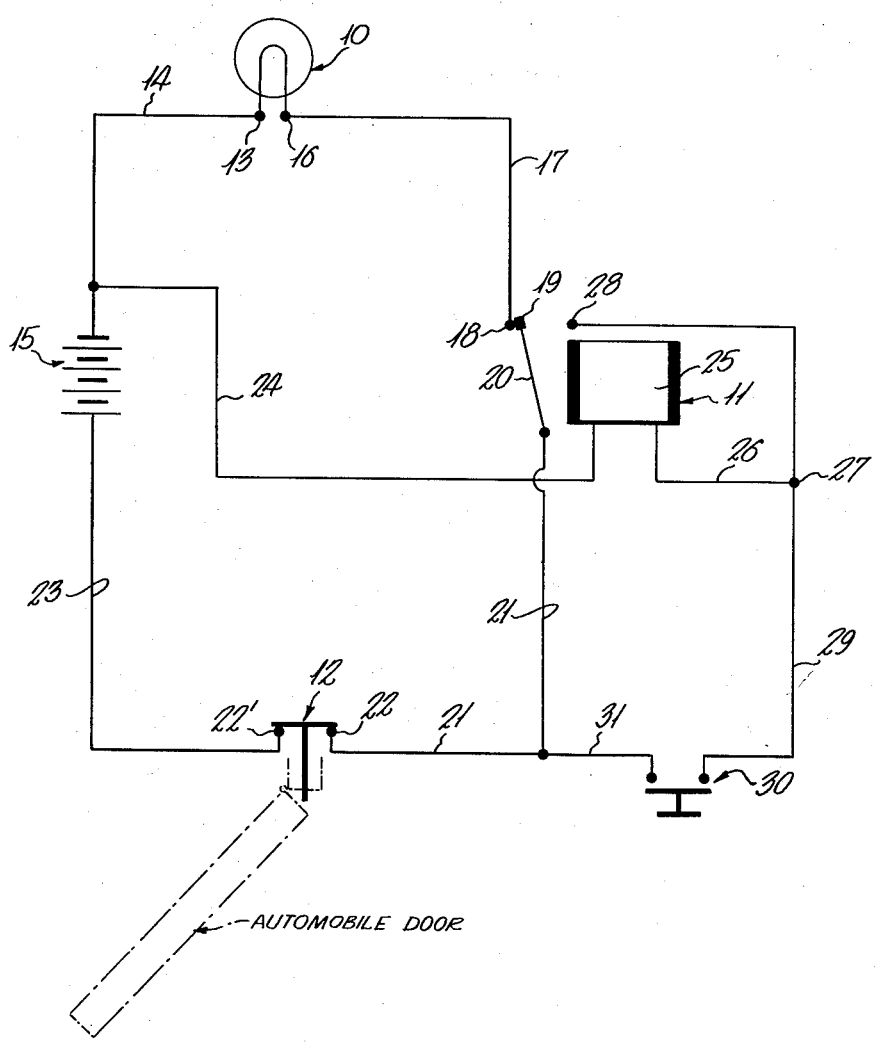
INVENTOR
Wallace O. Stephenson
BY
Mason, Fenwick & Lawrence
ATTORNEYS

United States Patent Office 2,840,759
Patented June 24, 1958

---

2,840,759

AUTOMOBILE DOME LIGHT CIRCUIT

Wallace O. Stephenson, Lookout Mountain, Tenn.

Application November 19, 1956, Serial No. 622,977

3 Claims. (Cl. 315—84)

The present invention relates in general to electric light control circuitry, and more particularly to circuitry for energizing the overhead dome light of an automobile when one of the automobile doors is open and for de-energizing the dome light in response to manual control.

It has been the common practice in recent years to so arrange the energizing circuit of the overhead dome light in automobiles so as to close the energizing circuit in response to opening of any of the automobile doors and maintain the circuit closed until it is interrupted by return of the automobile doors to closed position. This is usually accomplished by providing a push button switch in the door frame of each of the automobile doors adjacent the hinged edge of each door, which is spring urged to switch closing position with respect to the dome light circuit, at which position the plunger of the push button switch projects from the door frame. Accordingly, upon opening of the door, the movement of the adjacent door edge away from the push button switch allows the switch to be forced by its spring into circuit-closing position to energize the dome light, and on closing of the door, the plunger of the push button switch is engaged by the adjacent door edge and is shifted against the action of its spring into circuit-interrupting position to de-energize the dome light. It is frequently desirable, however, to de-energize the automobile dome light while one of the automobile doors is still open. In conventional automobile dome light circuitry, this can only be accomplished by manually depressing the plunger of the push button switch in the door frame of the open door to the position it normally occupies when the door is closed. The push button switches, however, are not readily accessible to persons seated within the automobile and de-energizing of the dome light in this manner would be undesirable.

An object of the present invention, therefore, is the provision of novel energizing circuitry for automobile dome lights and the like to render the energization of the dome light responsive to the position of the door and to permit manual de-energization of the dome light when a door of the automobile is in open position.

Another object of the present invention is the provision of novel circuitry associated with an automobile dome light energizing circuit responsive to opening of the door to energize the dome light while the door is open, whereby the dome light may be rendered non-responsive to the position of the automobile door until the door is again closed.

Another object of the present invention is the provision of a novel energizing circuit in association with an automobile dome light having means normally responding to opening of any of the automobile doors for energizing the dome light and manually actuatable means for de-energizing the dome light while the door is open and for automatically resuming normal response to the dome light to opening of the door when the door is again closed.

Other objects, advantages and capabilities of the present invention will become apparent from the following detail description, taken in conjunction with the accompanying drawing, illustrating one preferred embodiment of the invention.

The figure of the drawing is a schematic diagram of an automobile dome light energizing circuit embodying the present invention.

Referring to the drawing, the principal components of the preferred embodiment of the automobile dome light energizing circuit illustrated therein comprise the dome light 10, a single pole double throw direct current relay 11 and a push button door switch 12. One terminal 13 of the dome light 10 is directly connected by the lead 14 to the negative terminal of the automobile battery 15. The other terminal 16 of the dome light 10 is connected by the lead 17 to the upper stationary contact 18 of the relay 11. The movable contact 19 of the relay 11 carried on the contact arm 20 thereof, is connected through the lead 21 to one contact 22 of the door switch 12 which is spring urged to closed position, the other contact 22' of which is connected by the lead 23 to the positive terminal of the battery 15.

Thus, the normal energizing circuit of the dome light 10 is from the positive terminal of the battery 15 through the lead 23, the normally closed contacts 22, 22' of the door switch 12, lead 21, movable contact 19 and fixed contact 18 of the relay 11, lead 17, dome light 10 and lead 14 to the negative terminal of the battery 15.

Another lead 24 extends from the negative terminal of the battery 15 to one end of the coil 25 of the relay 11. The other end of the coil 25 is connected through the lead 26 to the terminal 27 of the lower fixed contact 28 of relay 11. By-passing the normally open gap between the fixed lower contact 28 and movable contact 19 of the relay 11 is a manual control circuit comprising a lead 29 extending from the terminal 27 of fixed contact 28 to one of the contacts of a normally open manual push button switch 30, preferably positioned on the dashboard of the automobile, the other contact of the push button switch 30 being connected by lead 31 to the movable arm 20 and movable contact 19 of the relay 11.

In the normal operation of the control circuit for the dome light 10, assuming the door to be in closed position whereby the door responsive switch 12 is in open position, no current will flow through the energizing circuit of the dome light 10 comprising lead 23, switch 12, lead 21, relay contacts 19, 18, lead 17, dome light 10 and lead 14. When the door is opened, the withdrawal of the adjacent door edge from restraining contact with the plunger of the door switch 12 permits the spring of the switch 12 to close the switch, thereby completing the above-described energizing circuit. Upon return of the door to closed condition, engagement of the door with the plunger of the switch 12 returns the switch to open position interrupting this energizing circuit and de-energizing the light 10.

If it be desired to de-energize the dome light 10 when the door is open and the switch 12 is in circuit-closing position, the occupant of the automobile depresses the push button 30 on the dashboard to complete the energizing circuit through the coil 25 of the relay 11, which is traced as follows: Lead 23 from the positive terminal of the battery 15, door switch 12, leads 21 and 31, by-passing switch 30, leads 29 and 26, relay coil 25 and lead 24 to the negative terminal of the battery 15. Magnetic field produced by flow of current in the relay coil 25 draws the movable relay contact arm 20 downwardly interrupting the contacts 19 and 18 and engaging the movable contact 19 with fixed contact 28. This establishes a hold circuit through the relay coil 25, the engagement of the movable relay contact 19 with the lower fixed contact 28 establishing a circuit bypassing the push button 30 to maintain current flow through the relay coil 25 until the contacts 22, 22' of the door switch 12 are interrupted. The breaking of the circuit by the movable contact 19 and fixed contact 18 upon energizing of the relay coil 25 interrupts the above-traced energizing circuit of the dome light to de-energize the light. Accordingly, the dome light 10 remains de-energized following depression of the push button 30, even though the automobile door associated with door switch 12 is open, until such time as the door is closed. Since closing of the door open-circuits the door switch 12, this interrupts the hold circuit for the relay coil 25 collapsing the magnetic field of the relay and permitting return of the relay arm 20 to its normal spring biased position wherein the contact 19 engages the fixed contact 18. The circuit then resumes its normal condition wherein energizing of the dome light 10 is rendered automatically responsive to the position of the door associated with the door switch 12.

It will be understood that the above-described circuit may be associated with any number of automobile doors to render energizing of the dome light responsive to opening of any of these doors by providing a number of door switches 12 equal to the number of doors connected in parallel with the door switch 12 illustrated in the drawing between the leads 21 and 23.

While only one preferred embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

I claim:

1. In a door-controlled dome light circuit for automobiles and the like, a power source, a dome light, a door-actuated switch biased to energize the lamp from said power source when the door is open and positioned to be engaged by the door when the latter is closed and shifted to dome light de-energizing position, relay means having normally closed contacts coupled in series with said dome light to selectively interrupt current flow from said power source to said dome light, a push button switch for energizing said relay to open said relay contacts upon manual actuation of the push button switch, hold circuit means responsive to opening of said relay contacts to maintain said relay energized following actuation of said push button switch, and means intercoupling said hold circuit means to said power source through said door-actuated switch for open-circuiting said hold circuit means when said door-actuated switch is shifted to dome light de-energizing position.

2. In a door-controlled electric dome light circuit for automobiles and the like, a door-actuated switch normally tensioned to close the dome light circuit and responsive to the position of the door to interrupt the dome light circuit when the door is closed and to close the lighting circuit when the door is open, relay means having normally closed relay contacts interposed in said dome light circuit for selectively interrupting the circuit and de-energizing the dome light, a push button switch intercoupled with said door-actuated switch and said relay for energizing the relay when the door-actuated switch is closed to open said relay contacts and interrupt said dome light circuit, other relay contact means responsive to energization of said relay and opening of said first-mentioned relay contacts to establish an auxiliary relay energizing circuit bypassing said push button switch for maintaining said relay energized following actuation of said push button switch and when said door-actuated switch is closed, said auxiliary circuit being intercoupled with said door-actuated switch for interrupting said auxiliary relay energizing circuit upon opening of said door-actuated switch to allow said first-mentioned relay contacts to return to normally closed position.

3. In a door-controlled electric lighting circuit, a power source, a lamp, a switch biased to energize the lamp from said power source, said switch being positioned adjacent the door to be shifted by the door to lamp-de-energizing condition when the door is in closed position, circuit interrupting means including contacts biased to closed position interposed in the lamp energizing circuit and control means responsive to current flow therethrough for opening said contacts, manual switch means for establishing current flow through said control means to open said contacts and de-energize said lamp, means responsive to energization of said control means maintaining the latter in circuit interrupting condition, and means responsive to shifting of said first-mentioned switch to lamp-de-energizing condition in response to closing of the door for terminating current flow in said control means to release said contacts from circuit interrupting condition.

References Cited in the file of this patent
UNITED STATES PATENTS

| | | |
|---|---|---|
| 2,509,590 | Galt | May 30, 1950 |
| 2,523,125 | Ley | Sept. 19, 1950 |
| 2,598,420 | Onksen | May 27, 1952 |
| 2,732,444 | King | Jan. 24, 1956 |